(12) United States Patent
Enyedy et al.

(10) Patent No.: US 7,161,272 B2
(45) Date of Patent: Jan. 9, 2007

(54) WELDING WIRE FEEDER AND MOTOR THEREFOR

(75) Inventors: Edward A. Enyedy, Eastlake, OH (US); Keith L. Clark, Concord, OH (US)

(73) Assignee: Lincoln Global, Inc., City of Industry, CA (US)

( * ) Notice: Subject to any disclaimer, the term of this patent is extended or adjusted under 35 U.S.C. 154(b) by 73 days.

(21) Appl. No.: 10/687,170

(22) Filed: Oct. 17, 2003

(65) Prior Publication Data
US 2005/0083005 A1 Apr. 21, 2005

(51) Int. Cl.
*H02K 39/38* (2006.01)

(52) U.S. Cl. .................. 310/238; 310/241

(58) Field of Classification Search ............ 310/233, 310/238, 241–242
See application file for complete search history.

(56) References Cited

U.S. PATENT DOCUMENTS

| | | | |
|---|---|---|---|
| 1,508,712 A * | 9/1924 | Noble ................. 314/73 |
| 3,586,935 A * | 6/1971 | Lundelius et al. ........ 318/269 |
| 4,827,897 A * | 5/1989 | Yamada et al. ........... 123/497 |
| 6,066,833 A | 5/2000 | Rigdon | |
| 6,427,894 B1 | 8/2002 | Blank | |

\* cited by examiner

*Primary Examiner*—Thanh Lam
(74) *Attorney, Agent, or Firm*—Fay, Sharpe, Fagan, Minnich & McKee, LLP

(57) ABSTRACT

A wire feeder for an electric arc welder comprising a set of feed rolls driven by a DC motor with a commutator, first and second opposite polarity leads receiving power to drive the motor, and having a first brush at a given position on the commutator and connected to the first lead, a second brush circumferentially spaced from the first brush a first annular distance around the commutator and connectable to the second lead to cause the motor to rotate at a first speed to drive the rolls at a first speed, a third brush circumferentially spaced from the first brush a second annular distance around the commutator and connectable to the second lead to cause the motor to rotate at a second speed to drive the rolls at a second speed, and a switching circuit with an operative condition to connect the second lead to a selected one of the second and third brushes.

21 Claims, 1 Drawing Sheet

WELDING WIRE FEEDER AND MOTOR THEREFOR

The present invention relates to the art of electric arc welding and more particularly to a novel welding wire feeder and a motor for driving the feed rolls of the wire feeder.

INCORPORATION BY REFERENCE

The present invention relates to the concept of changing the nominal speed of the feed rolls in a wire feeder for an electric arc welder. The general speed and torque are controlled by a motor that drives a gear box as shown in Rigdon U.S. Pat. No. 6,066,833 (FIG. 9) and Blank U.S. Pat. No. 6,427,894 (FIG. 4) The actual wire feed speed is changed by a controller, but the invention relates to the nominal speed determined by the motor and gear box of these prior art patents. They are incorporated by reference as background information.

BACKGROUND OF INVENTION

Electric arc welders include a wire feeder for feeding welding wire from a spool through a welding torch or gun to a welding operation. Such feeders normally include a DC motor for rotating the drive rolls by which the wire is pulled from the spool and forced into the welding operation. Wire feeders routinely have a high speed, low torque DC drive motor connected through a gear box that includes reduction gears to convert rotation of the motor to the proper rotation and torque at the drive rolls. The use of a DC motor with a gear reducer to rotate the drive rolls represents an economic and efficient package universally employed in the welding industry. However, sizing of the DC motor to be suitable for a wide range of welding applications is quite difficult. Large diameter electrodes are often fed at a low wire feed speed and require the wire feeder to generate a high torque to overcome friction in the driving operation. Small diameter wires are used for a wide range of welding operations. The maximum wire feed speed for a small diameter wire may be two or three times more than the maximum wire feed speed of a larger diameter wire. The friction involved in feeding small diameter wire to the welding operation is substantially less than the friction employed when feeding large diameter wires. To create a universal wire feeder that accommodates both large diameter wires and small diameter wires, welding equipment manufacturers normally provide a gear box having changeable gears to change the gear ratio between the motor and the drive rolls. In operation, changing from one size wire to another is not frequent. Consequently, the use of a changeable gear box between the motor and feed rolls has become standard in the welding industry. Designing wire feeders for changing gear box ratios incurs an extra cost in the product. More than one gear must be provided to the end user. They must be stored and retained. The replacement gear is often misplaced and must be purchased again as a separate aftermarket item. Furthermore, the DC motor is often mounted at a different position when the gear ratio is changed. Consequently, the overall product size must be larger to accept the different motor orientations for different gear ratios. Costs are incurred by the end user and/or the distributor who must experience down time changing from one gear ratio to another. This type of wire feeder often has different mounting arrangements for the motor when different gears are used in the gear box. All of these disadvantages of the existing wire feeders for an electric arc welder are overcome by the present invention.

SUMMARY OF INVENTION

The wire feeder constructed in accordance with the present invention overcomes the need for a changeable gear box as normally used in the welding industry. The new design uses a DC motor where different speeds and torques of the combined motor and gear box arrangement are created by different brush positions in the DC motor itself. Most DC motors have two brushes circumferentially spaced around the commutator at a position 180° apart. In this position the motor generates the most torque and operates in a very efficient manner. In accordance with the invention, a third brush is added at another position or one of the brushes is moved so the angle between the active brushes is no longer 180°. This changes the torque and speed curve of the combined motor and gear box. The gear box has a single fixed gear ratio that need not be changed. Changing power between the high speed brush position and the low speed brush position is done manually by the welder using a switch on the wire feeder. However, change in the effective spacing of the brushes for the DC motor is preferably done automatically by electronics through a digital controller. When the power is switched from one speed to the other speed, the wire feed controller, in one option, momentarily switches the high speed brush location for faster acceleration of the wire. After a set period of time, the selected speed is used. Indeed, this type of operation can be used for both high speed and low speed operations of the motor used in the wire feeder. A high speed and low speed DC motor has not been used in electric arc welding for wire feeders. There have been the use of similar motors in windshield wipers for automobiles.

In accordance with the present invention, there is provided a wire feeder for an electric arc welder comprising a set of feed rolls driven by a DC motor with a commutator, first and second opposite polarity leads receiving power to drive the motor, and having a first brush at a given position on the commutator and connected to the first lead. There is provided a second brush circumferentially spaced from the first brush a first annular distance around the commutator and connectable to the second lead to cause the motor to rotate at a first speed to drive the feed rolls at a first speed. A third brush is provided circumferentially spaced from the first brush a second annular distance around the commutator connectable to the second lead to cause the motor to rotate at a second speed to drive the feed rolls at a second speed. In accordance with the invention, a switching circuit has an operative condition to connect the second lead to a selected one of the second and third brushes.

In accordance with the invention, the wire feeder includes a gear reducer between the motor and feed roll; however, the gear reducer has a fixed ratio and need not be changed to obtain different drive speeds for the feed rolls.

In accordance with another aspect of the present invention, the switching circuit, when in the condition to select the second brush, has a time delay circuit for selecting the third brush for a time before selecting the second brush. This allows a short time of acceleration for the feed rolls. The wire feeder has a circuit to latch the switch circuit in its operative condition when power is received by leads, so speed change occurs prior to driving of the feed rolls in a given weld process.

In accordance with another aspect of the present invention, there is provided a DC motor for driving a wire feeder for an electric arc welder. The DC motor has a commutator, first and second opposite polarity leads receiving power to drive the motor, a first brush at a given position on the commutator and connected to the first lead, a second brush circumferentially spaced from the first brush a first annular distance around the commutator and connectable to the second lead to cause the motor to rotate at a first speed and a third brush circumferentially spaced from the first brush a second annular distance around the commutator and connectable to the second lead to cause the motor to rotate at a second speed.

In accordance with another aspect of the present invention, only two brushes are employed in the DC motor. One brush is moved to change the annular position of the brushes connected to the power leads for changing the speed of the motor connected to a fixed gear box of the wire feeder.

The primary object of the present invention is the provision of a wire feeder for an electric arc welder, which wire feeder uses a fixed gear box between the motor and feed rolls where the speed of the DC motor driving the gear box is changed to change the speed of the wire feeder. Of course, the wire feed speed is also adjusted by the controller of the welder.

Another object of the present invention is the provision of a DC motor, which motor has a movable brush to cause different speeds in a wire feeder of an electric arc welder.

These and other objects and advantages will become apparent from the following description taken together with the accompanying drawings.

PREFERRED EMBODIMENT

Figure 1:
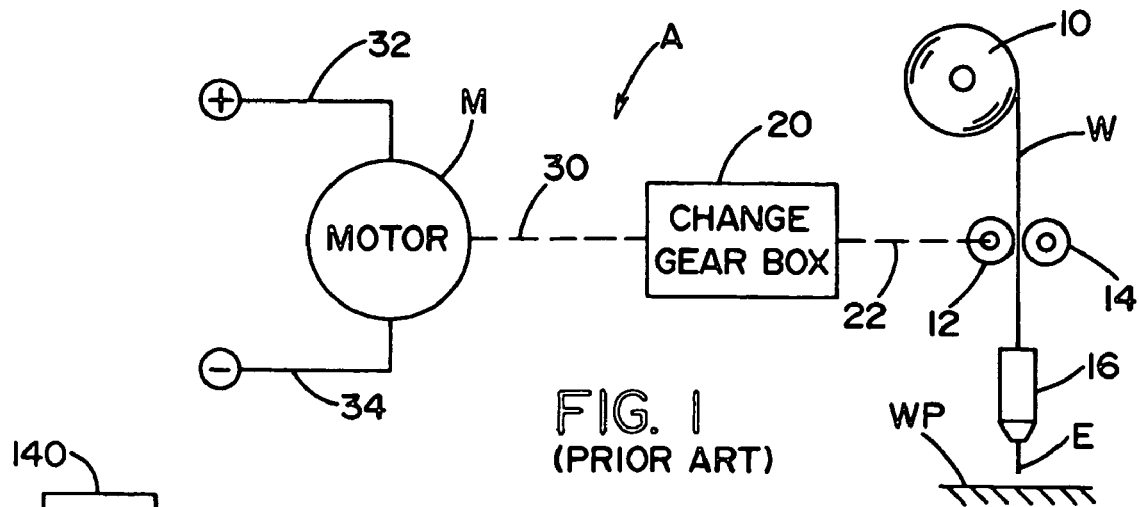
FIG. 1 is a schematic diagram of a wire feeder constructed in accordance with standard welder technology.

Referring now to the drawings wherein the showings are for the purpose of illustrating the preferred embodiment of the invention only, and not for the purpose of limiting same, FIG. 1 shows a prior art wire feeder A for an electric arc welder, where welding wire W is provided by spool 10 through drive rolls 12, 14 to a welding gun or torch 16 for creating a welding operation between electrode E and workpiece WP. Box 20 is a gear reducer and has an output shaft 22 for driving rolls 12, 14 in accordance with standard technology. Input shaft 30 for gear box 20 is the output shaft of motor M receiving power from opposite polarity leads 32, 34. Of course, the voltage on these leads is adjusted by a microprocessor or other controller to determine the actual wire feed speed (WFS) utilizing the relationship of the motor and drive rolls controlled by a gear box 20. During the welding operation, motor M operates in accordance with the voltage on leads 32, 34 to drive the rolls in accordance with the gear ratio of gear box 20. When the diameter of wire W is large, a certain gear ratio is required in box 20. A different gear ratio is preferred when the diameter of the wire is smaller. In order to accomplish the change in gear ratio, gears in the box 20 must be manually changed. This involves both moving the motor and making changes in the gears. The present invention relates to an improvement wherein the gear box 20 is a fixed gear ratio as shown in the wire feeder A' in FIG. 2.

Figure 3:
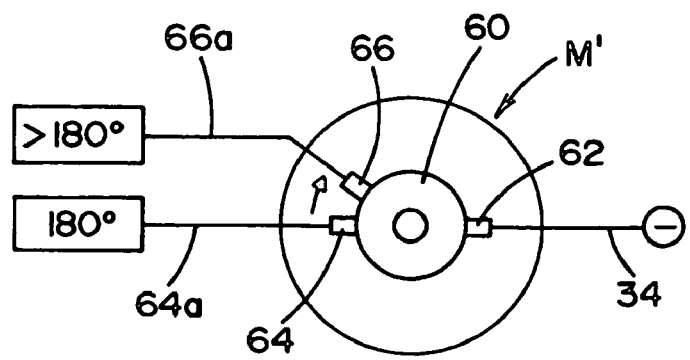

Referring now in more detail to the invention comprising wire feeder A', this wire feeder includes gear box 50 having a fixed ratio that need not be changed to change the general speed of feed rolls 12, 14. The invention involves a novel construction of motor M', best shown in FIG. 3. DC motor M' has a commutator 60 with a fixed first brush 62 connected to power lead 34. A standard second brush 64 having an input line 64a is annularly spaced 180° from brush 62. This produces a low speed torque output for shaft 30 driving fixed ratio gear box 50. In accordance with the invention, motor M' includes a third brush 66 connected to line 66a which brush has an annular location or position from brush 62 that is less than 180°. Thus, when power is directed through line 66a, motor M' operates at a higher speed and lower torque. The invention involves applying power to either brush 64 or brush 66 to change the speed of motor M'. Thus, box 50 need not be changed when large wire is being fed or small wire is being fed. As indicated in FIG. 3, the invention can also be performed by merely moving brush 64 to the position of brush 66; however, the use of two brushes with two input lines 64a, 66a is preferred and is the most effective manner of performing the present invention. To control the power through either line 64a or line 66a, the invention utilizes a switching circuit 100 to switch the power on lead 32 to either of the two input lines of motor M'. This is the basic aspect of the invention. The manner for switching between lines 64a, 66a can be modified. In the illustrated embodiment of the invention, a manual device such as a knob or selector 110 creates a signal in line 112 indicating which of the brushes 64, 66 is activated by circuit 100. Preferably, a digital controller 120 is used for automatically shifting between lines 64a, 66a in accordance with the wire being used for communication with the controller as input information from device 140. Selector device 140 controls the signal on line 122 from controller 120. Either the signal on line 112 or the signal on line 122 controls the logic on line 130 directed to the input of switch circuit 100 for selecting between lead 32 and either line 64a or line 66a. In accordance with a feature of the invention, switch circuit 100 includes a delay circuit. If the switch is shifted to select the low speed by activation of brush 64, the high speed brush 66 is initially selected for a short time. This accelerates feed rolls 12, 14 for a short period of time. Switch circuit 100 then actuates the connection between lead 32 and line 64a for the welding operation. In accordance with another feature of the illustrated invention, power from lead 32 is directed by line 160 through inverter 162 to the enable terminal E of switch circuit 100. Thus, when there is power to motor M', the switch condition remains fixed. In this manner, the selection of brush 64 or brush 66 is accomplished before motor M' receives its power from leads 32, 34. During operation, the welding process changes the voltage on lines 32, 34 to change the wire feed speed (WFS) even though the gear ratio remains the same. The wire feed speed is controlled by a standard microprocessor or other digital processor that is responsive to a wire feed speed control program or circuit.

Figure 2:
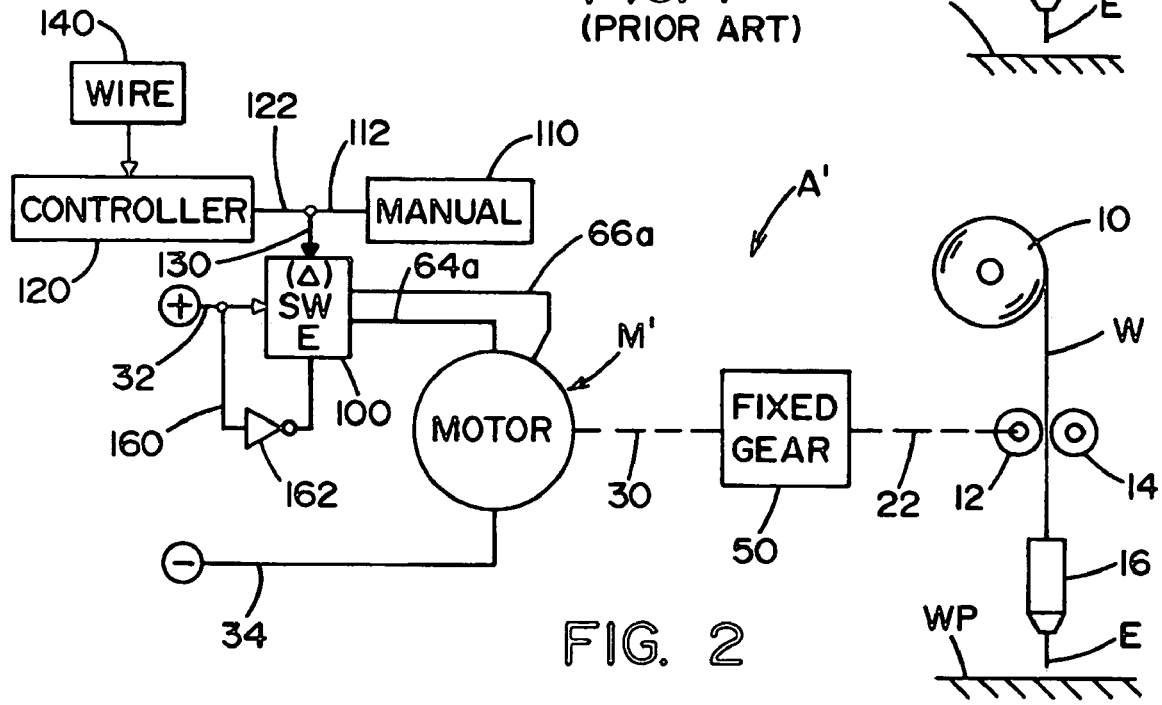
FIG. 2 is a schematic diagram of a wire feeder for an electric arc welder using the preferred embodiment of the present invention; and, FIG. 3 is a schematic diagram illustrating the position of the brushes for the DC motor as used in the preferred embodiment of the present invention.

The present invention relates to a novel motor M' and the use of that motor in a wire feeder as illustrated in FIG. 2. Brushes 64, 66 can be fixedly positioned as shown in FIG. 3 or movable as schematically indicated in FIG. 3. Furthermore, the invention can include more than two angularly spaced brushes so that switch circuit 100 can select more than two different motor speeds to accommodate even further diversity and versatility of the novel wire feeder A'.

In accordance with the invention an additional brush is used in motor M' with a line connectable to lead 32 so a third speed is selectable by a multi-pole version of switch 100. Consequently, the wire feeder has a high speed, medium speed and low speed with a fixed gear box. In these speeds, the controller will set the actual wire feed speed (WFS).

Having thus defined the invention, the following is claimed:

1. A wire feeder for an electric arc welder comprising a set of feed rolls driven by a DC motor with a commutator, first and second opposite polarity leads receiving power to drive said motor, and having a first brush at a given position on said commutator and connected to said first lead, a second brush circumferentially spaced from said first brush a first annular distance around said commutator and connectable to said second lead to cause said motor to rotate at a first speed to drive said rolls at a first speed, a third brush circumferentially spaced from said first brush a second annular distance around said commutator and connectable to said second lead to cause said motor to rotate at a second speed to drive said rolls at a second speed, and a switching circuit with an operative condition to connect said second lead to only a selected one of said second and third brushes to the exclusion of the other one of said second and third brushes.

2. A wire feeder as defined in claim 1 wherein said switching circuit is operated manually.

3. A wire feeder as defined in claim 1 including a controller with a first output signal causing said switching circuit to select said second brush and a second signal causing said switching circuit to select said third brush.

4. A wire feeder as defined in claim 3 wherein said controller output signal is caused by an input signal indicative of wire size.

5. A wire feeder as defined in claim 4 wherein said wire feeder includes a fixed ratio gear reducer between said motor and said feed rolls.

6. A wire feeder as defined in claim 3 wherein said wire feeder includes a fixed ratio gear reducer between said motor and said feed rolls.

7. A wire feeder as defined in claim 2 wherein said wire feeder includes a fixed ratio gear reducer between said motor and said feed rolls.

8. A wire feeder as defined in claim 1 wherein said wire feeder includes a fixed ratio gear reducer between said motor and said feed rolls.

9. A wire feeder as defined in claim 8 wherein said switching circuit when in the condition to select said second brush has a time delay for selecting said third brush for a time before selecting said second brush.

10. A wire feeder as defined in claim 3 wherein said switching circuit when in the condition to select said second brush has a time delay for selecting said third brush for a time before selecting said second brush.

11. A wire feeder as defined in claim 2 wherein said switching circuit when in the condition to select said second brush has a time delay for selecting said third brush for a time before selecting said second brush.

12. A wire feeder as defined in claim 1 wherein said switching circuit when in the condition to select said second brush has a time delay for selecting said third brush for a time before selecting said second brush.

13. A wire feeder as defined in claim 12 including a circuit to latch said switch circuit in said operative condition when power is received by said leads.

14. A wire feeder as defined in claim 8 including a circuit to latch said switch circuit in said operative condition when power is received by said leads.

15. A wire feeder as defined in claim 3 including a circuit to latch said switch circuit in said operative condition when power is received by said leads.

16. A wire feeder as defined in claim 2 including a circuit to latch said switch circuit in said operative condition when power is received by said leads.

17. A wire feeder as defined in claim 1 including a circuit to latch said switch circuit in said operative condition when power is received by said leads.

18. A wire feeder for an electric arc welder comprising a set of feed rolls driven by a motor and a switching circuit to change the speed of said motor between a first and second speed, said motor having a commutator with a first brush at a given position on said commutator and connected to a first lead of first and second opposite polarity leads that receive power from said commutator to drive said motor, said commutator with a second brush circumferentially spaced from said first brush a first annular distance around said commutator and a third brush circumferentially spaced from said first brush a second annular distance around said commutator that is different than said first annular distance, said switching circuit alternately connecting a second lead of said first and second opposite polarity leads to said second and third brushes, said motor at said first speed when said second lead is connected to said second brush and at said second speed when said second lead is connected to said third brush.

19. A wire feeder as defined in claim 18 wherein said switching circuit is operated manually.

20. A wire feeder as defined in claim 19 wherein when said switching circuit selects said first speed a circuit selects said second speed for a time to accelerate said feed rolls for said time.

21. A wire feeder for an electric arc welder comprising a set of feed rolls driven by a D.C motor with a commutator, first and second opposite polarity leads receiving power to drive said motor and having a first brush at a given position on said commutator and connected to said first lead and a second brush circumferentially spaced from said first brush an annular distance around said commutator and connected to said second lead and a device to change the annular distance to change the speed of said motor driving said feed rolls.

* * * * *